(12) United States Patent
Shuang et al.

(10) Patent No.: US 9,300,438 B2
(45) Date of Patent: Mar. 29, 2016

(54) METHOD AND SYSTEM FOR TRANSMITTING LARGE OBJECT

(75) Inventors: Jianping Shuang, Shenzhen (CN); Bo Chen, Shenzhen (CN); Xing Liu, Shenzhen (CN); Luyong Xu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 74 days.

(21) Appl. No.: 14/351,628

(22) PCT Filed: Jan. 10, 2012

(86) PCT No.: PCT/CN2012/070158
§ 371 (c)(1),
(2), (4) Date: Apr. 14, 2014

(87) PCT Pub. No.: WO2013/056518
PCT Pub. Date: Apr. 25, 2013

(65) Prior Publication Data
US 2014/0317465 A1 Oct. 23, 2014

(30) Foreign Application Priority Data
Oct. 18, 2011 (CN) .......................... 2011 1 0316789

(51) Int. Cl.
*H04L 1/18* (2006.01)
*H04L 1/08* (2006.01)
(Continued)

(52) U.S. Cl.
CPC .. *H04L 1/08* (2013.01); *H04L 1/00* (2013.01); *H04L 67/06* (2013.01)

(58) Field of Classification Search
CPC .................................................... H04L 1/1809
USPC .................... 714/746, 748, 749, 776, 800
See application file for complete search history.

(56) References Cited

U.S. PATENT DOCUMENTS 5,452,299 A * 9/1995 Thessin ................... H04L 29/06
370/260
5,857,203 A * 1/1999 Kauffman ......... G06F 17/30955
(Continued)

FOREIGN PATENT DOCUMENTS

AU 2002357275 A1 7/2003
CN 101656756 A 2/2010
(Continued)

OTHER PUBLICATIONS

International Search Report issued in corresponding application No. PCT/CN2012/070158 on Aug. 2, 2012.
(Continued)

*Primary Examiner* — Fritz Alphonse
(74) *Attorney, Agent, or Firm* — Brundidge & Stanger, P.C.

(57) ABSTRACT

The present disclosure provides a method for transmitting a large object, after a server establishes a session with a client, the method includes: the server divides a pre-transmitted large object into data blocks, and transmits one by one in sequence acquired data blocks and their sizes to the client; the client determines whether a received data block is transmitted successfully, if the received data block is transmitted successfully, the data block is saved, and a current data block transmission success message is returned to the server; if the received data block is not transmitted successfully, an end session request message or a re-transmitting current data block request message is returned to the server; and the server transmits the corresponding data block and its size or ends the session according to the received messages. The present disclosure further provides a system for transmitting a large object. When there is an error in transmitting a data block of a large object, the method and the system in the present disclosure process it in advance, thus saving bandwidth resources.

9 Claims, 3 Drawing Sheets

(51) Int. Cl.
*H04L 29/08* (2006.01)
*H04L 1/00* (2006.01)

(56) References Cited

U.S. PATENT DOCUMENTS

| | | | | |
|---|---|---|---|---|
| 5,878,220 | A * | 3/1999 | Olkin | H04L 12/5692 709/203 |
| 6,938,211 | B1 * | 8/2005 | Chang | G06F 17/30902 707/E17.12 |
| 7,171,493 | B2 | 1/2007 | Shu et al. | |
| 7,206,910 | B2 * | 4/2007 | Chang | G06F 9/465 711/145 |
| 8,824,581 | B2 * | 9/2014 | Okada | H04L 25/4908 341/180 |
| 2003/0115364 | A1 | 6/2003 | Shu et al. | |
| 2011/0264763 | A1 * | 10/2011 | Yu | H04L 41/0233 709/217 |
| 2012/0005315 | A1 | 1/2012 | Chen et al. | |

FOREIGN PATENT DOCUMENTS

| | | |
|---|---|---|
| CN | 101877862 A | 11/2010 |
| EP | 2426859 A1 | 3/2012 |
| JP | 2001086190 A | 3/2001 |
| JP | 2001101758 A | 4/2001 |
| JP | 2004080165 A | 3/2004 |
| JP | 2004536502 A | 12/2004 |
| WO | 03055175 A1 | 7/2003 |
| WO | 2010124567 A1 | 11/2010 |

OTHER PUBLICATIONS

International Publication issued in corresponding application No. PCT/CN2012/070158 on Apr. 25, 2013.

Lakshmeshwar, S. et al. Suspend and Resume Feature for OMA DM Large Object Delivery. The 3rd International Conference on Grid and Pervasive Computing Workshops, May 2008, pp. 206-212.

English Translation of the Written Opinion of the International Search Authority in international application No. PCT/CN2009/072629, mailed on Oct. 1, 2009.

* cited by examiner

METHOD AND SYSTEM FOR TRANSMITTING LARGE OBJECT

TECHNICAL FIELD

The present disclosure relates to transmission technologies based on the Open Mobile Alliance (OMA) Synchronization Markup Language (SyncML) in the field of communications, and in particular to a method and a system for transmitting a large object.

BACKGROUND

The OMA SyncML protocol supports the transmission of an object, when the size of the object is larger than a maximum number of bytes in a message supported by a client, the object is referred to as a large object, i.e., the size of an object to be transmitted (indicated by a Size element in a SyncML message) is larger than the maximum number of bytes in a message (indicated by a MaxMsgSize element in a SyncML message) supported by the client, then the object is a large object. For the transmission of a large object, the method specified in the OMA SyncML protocol generally includes: dividing the large object into data blocks, and transmitting the data blocks to a client by a SyncML message, wherein the size of each data block is equal to or smaller than the maximum number of bytes in a message supported by the client, and the transmission of the large object is implemented based on a basic session in the OMA SyncML protocol.

A basic session process in the OMA SyncML protocol includes two phases: session establishment and session management. The session establishment phase can be triggered by either a server or a client, and the session management is entered after a session has established between both sides. The client interacts with the server in the session management phase and completes the transmission of the large object. The way for transmitting a large object is specified in the OMA SyncML protocol.

The existing transmission process based on the OMA SyncML protocol mainly includes the following steps:

step 1: A server establishes a session with a client, and acquires a MaxMsgSize of the client;

step 2: The server transmits a large object transmission instruction, divides the large object data according to the specified MaxMsgSize, and transmits the size of the large object (indicated by a MaxMsgSize element in a SyncML message) and a first data block to the client;

step 3: The client saves the size of the large object and the first data block, and notifies the server to transmit sequentially a next data block;

step 4: The server transmits sequentially the next data block until all the data are transmitted (indicated by a Final element in a SyncML message); and step 5: After the client receives a large object transmission completion instruction, the client combines all the data blocks, calculates the total size of all the data blocks, and compare it with the saved size of the large object, so as to check whether the large object is transmitted successfully.

It can be seen from the above flow that this transmission method has some disadvantages, i.e., it is not until all the data blocks of the large object are transmitted completely that it can be known whether the large object is transmitted successfully, therefore, even though a data block received by the client has an error, the client will not know it, instead, the client still notifies the server to transmit sequentially a next data block, which results in a waste of interaction time and bandwidth resources.

SUMMARY

The present disclosure is intended to provide a method and a system for transmitting a large object, so as to optimize the existing method for transmitting a large object.

To this end, the technical solutions of the present disclosure are provided as follows.

A method for transmitting a large object, after a server establishes a session with a client, the method includes:

the server divides a pre-transmitted large object into data blocks, and transmits one by one in sequence acquired data blocks and their sizes to the client;

the client determines whether a received data block is transmitted successfully, if the received data block is transmitted successfully, the data block is saved, and a current data block transmission success message is returned to the server; if the received data block is not transmitted successfully, an end session request message or a re-transmitting current data block request message is returned to the server; and the server transmits the corresponding data block and its size or ends the session according to the received messages.

Preferably, the client determines whether the received data block is transmitted successfully by the following way:

a actual size of the data block is calculated; and the actual size of the data block is compared with the received size of the data block, if they are the same, the data block is transmitted successfully; otherwise, the data block is transmitted unsuccessfully.

Preferably, if a currently-transmitted data block is a first data block of the large object, the server further transmits the size of the large object to the client; and the client saves the received size of the large object.

Preferably, if a currently-transmitted data block is a final data block of the large object, the server further transmits a transmission end indicator to the client;

after the transmission end indicator is received and the current data block is transmitted successfully, the client implements the following steps:

saved data blocks are combined in sequence and a total size of the data blocks is calculated; and the total size of the data blocks is compared with the saved size of the large object, if they are the same, a large object transmission success message is returned to the server; otherwise, a large object transmission fail message is returned to the server.

Preferably, the step that the server transmits the corresponding data block and its size or the session is ended according to the received messages, specifically includes:

when the current data block transmission success message is received and there are other data blocks to be transmitted, the server transmits a next data block and its size to the client;

when the re-transmitting current data block request message is received, the server transmits sequentially the current data block and its size to the client; and when the end session request message, the large object transmission success message or the large object transmission fail message is received, the server ends the current session.

Preferably, the server transmits the data block and its size, the size of the large object and a transmission end indicator to the client by an extended Synchronization Markup Language (SyncML) message; and the extended SyncML message includes a Size element, a Data element, a BlockSize element and a Final element, wherein the value of the Size element is the size of the large object, the value of the Data element is the currently-transmitted data block, the value of the BlockSize element is the size of the currently-transmitted data block, and the value of the Final element is the transmission end indicator.

The present disclosure further provides a system for transmitting a large object, including a server and a client, wherein the server is configured to: divide a pre-transmitted large object into data blocks and transmit one by one in sequence acquired data blocks and their sizes to the client; and transmit corresponding data block and its size or end a session according to messages returned by the client; and the client is configured to: determine whether a received data block is transmitted successfully and save the data block and return a current data block transmission success message to the server when the data block is transmitted successfully; and return an end session request message or a re-transmitting current data block request message to the server when the data block is not transmitted successfully.

Preferably, the server is configured to: transmit the size of the large object to the client when a first data block and its size are sent; and transmit a transmission end indicator to the client when a final data block and its size are sent; and the client is configured to: save the received size of the large object; and combine in sequence saved data blocks, calculate a total size of the data blocks, and compare the total size of the data blocks with the saved size of the large object, if they are the same, a large object transmission success message is returned to the server, if they are different, a large object transmission fail message is returned to the server.

Preferably, the server is configured to: transmit a next data block and its size to the client when the current data block transmission success message is received and there are other data blocks to be transmitted; transmit sequentially the current data block and its size to the client when the re-transmitting current data block request message is received; and end the current session when the end session request message, the large object transmission success message or the large object transmission fail message is received;

the client is configured to calculate a actual size of the data block and compare the actual size of the data block with the received size of the data block.

Preferably, the server transmits the data block and its size, the size of the large object and the transmission end indicator to the client by an extended SyncML message.

In the present disclosure, when a data block is transmitted, the size of the data block together with the data block is sent to a client, every time the client receives the data block, the client determines whether it is transmitted successfully, and either initiatively requires the server to end the session or requests the server to re-transmit the data block when the data block is transmitted unsuccessfully; in other words, when there is an error in transmitting a data block of a large object, the method and system in the present disclosure process it in advance, thus saving bandwidth resources.

DETAILED DESCRIPTION

In order to make the technical problem to be solved, technical solutions and advantages of the present disclosure clearer, the present disclosure will be further explained in detail below with reference to the drawings and embodiments. It should be understood that the specific embodiments are only used to interpret the present disclosure instead of limiting the present disclosure.

Figure 1:
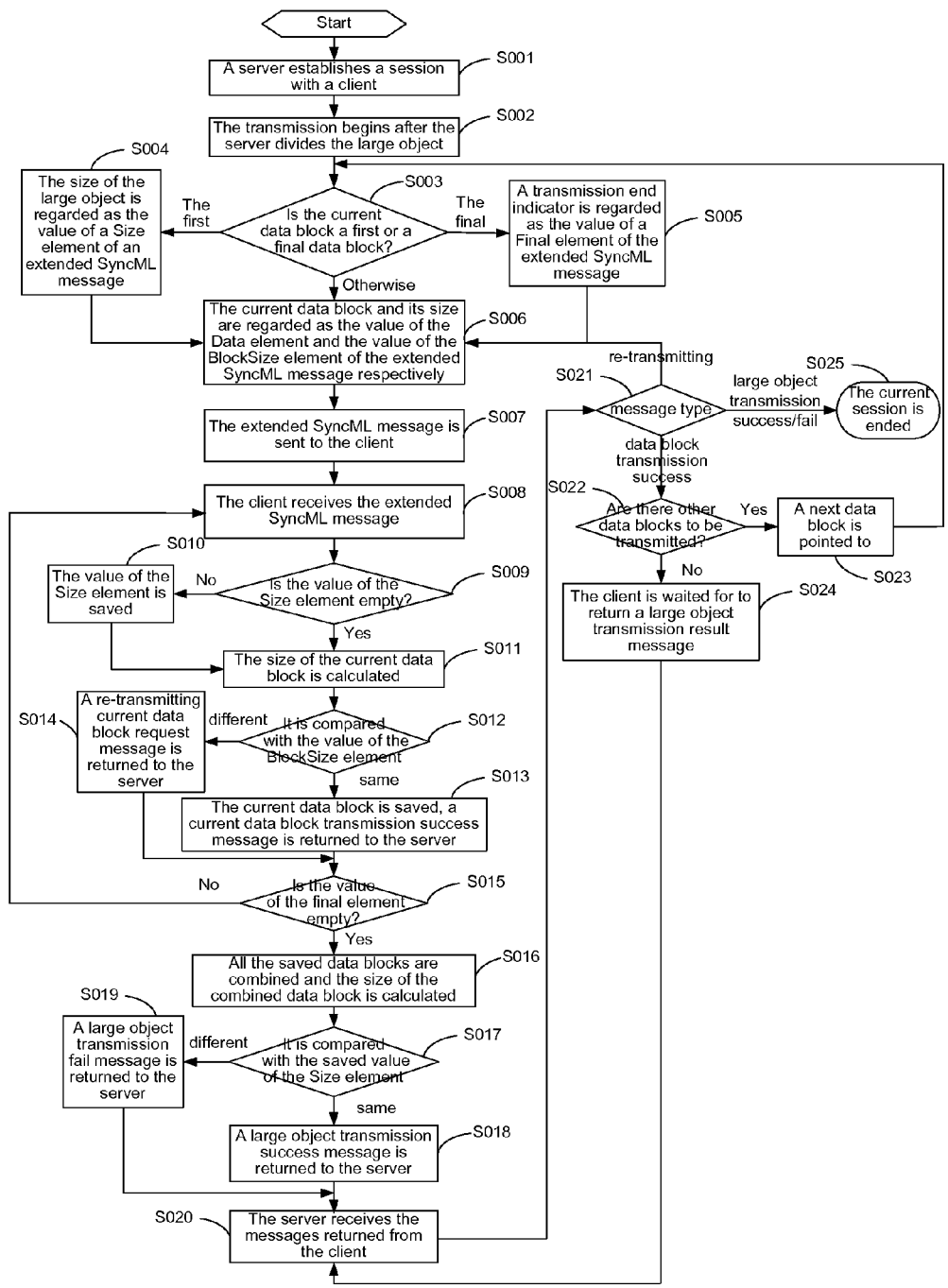
FIG. 1 shows a flowchart of a method for transmitting a large object according to a first preferred embodiment of the present disclosure.

FIG. 1 shows a flowchart of a method for transmitting a large object according to a first preferred embodiment of the present disclosure. In the embodiment, an unsuccessfully-transmitted data block is processed by a client by using a mechanism of requesting a server to re-transmit. The embodiment includes the following steps:

Step S001: A server establishes a session with a client;

Step S002: The currently-transmitted large object is divided according to a maximum number of bytes in a message supported by the client acquired in a session establishment process, and the large object is divided into data blocks and the transmission begins;

In this step, the large object is divided into data blocks with their sizes smaller than or equal to the maximum number of bytes in a message supported by the client and then the data blocks are transmitted.

Step S003: It is determined whether the current data block is a first data block or a final data block, if it is the first data block, Step S004 is implemented; if it is the final data block, Step S005 is implemented; otherwise, Step S006 is implemented;

Step S004: The size of the currently-transmitted large object is regarded as the value of a Size element of an extended SyncML message, and Step S006 is implemented;

In the present disclosure, the extended SyncML message includes a Size element, a Data element, a BlockSize element and a Final element, wherein the BlockSize element is a newly-added element of the present disclosure for carrying the size of the data block, the value of the Size element denotes the size of the currently-transmitted large object, the value of the Data element denotes the currently-transmitted data block, the value of the BlockSize element denotes the size of the currently-transmitted data block and the value of the Final element denotes a transmission end indicator.

Step S005: The transmission end indicator is indicated as the value of the Final element of the extended SyncML message;

Step S006: The current data block and its size are regarded as the value of the Data element and the value of the BlockSize element of the extended SyncML message respectively;

Step S007: The extended SyncML message is sent to the client;

In this step, when the currently-transmitted data block is the first data block of the large object, the value of the Size element of the extended SyncML message is not empty; when the currently-transmitted data block is the final data block of the large object, the value of the Final element of the extended SyncML message is not empty; in other conditions, the values of the Size element and the Final element of the SyncML message are empty.

Step S008: The client receives the extended SyncML message;

Step S009: It is determined whether the value of the Size element of the above message is empty, if it is empty, Step S010 is implemented; otherwise, Step S011 is implemented;

Step S010: The value of the Size element is saved;

This step actually saves the size of the large object, which serves as a basic for determining whether the large object is transmitted successfully in subsequent steps.

Step S011: The actual size of received data block is calculated;

Step S012: The actual size is compared with the value of the BlockSize element, if they are the same, Step S013 is implemented; otherwise, Step S014 is implemented;

Step S013: The current data block is saved, a current data block transmission success message is returned to the server, and Step S015 is implemented;

Step S014: The current data block is discarded, a re-transmitting current data block request message is returned to the server;

Step S015: It is determined whether the value of the Final element of the above message is empty, if it is empty, it indicates that the currently-transmitted data block is the final data block, and Step S016 is implemented; otherwise, Step S008 is implemented;

Step S016: All the saved data blocks are combined and the size of the combined data block is calculated;

Step S017: The size of the combined data block is compared with the saved value of the Size element, if they are the same, Step S018 is implemented; otherwise, Step S019 is implemented;

It can be determined in this step that there is a packet loss during data block transmission.

Step S018: A large object transmission success message is returned to the server, and Step S020 is implemented;

Step S019: A large object transmission fail message is returned to the server;

Step S020: The server receives the messages returned from the client;

Step S021: The type of the message returned from the client is determined, if it is the current data block transmission success message, Step S022 is implemented; If it is the re-transmitting current data block request message, Step S006 is implemented; and if it is the large object transmission success/fail message, Step S025 is implemented;

Step S022: It is determined whether there are other data blocks to be transmitted, if there are other data blocks to be transmitted, Step S023 is implemented; otherwise, Step S024 is implemented;

Step S023: A next data block is pointed to, and Step S003 is implemented;

Step S024: The client is waited for to return a large object transmission result message, and Step S020 is implemented;

Step S025: The current session is ended.

Figure 2:
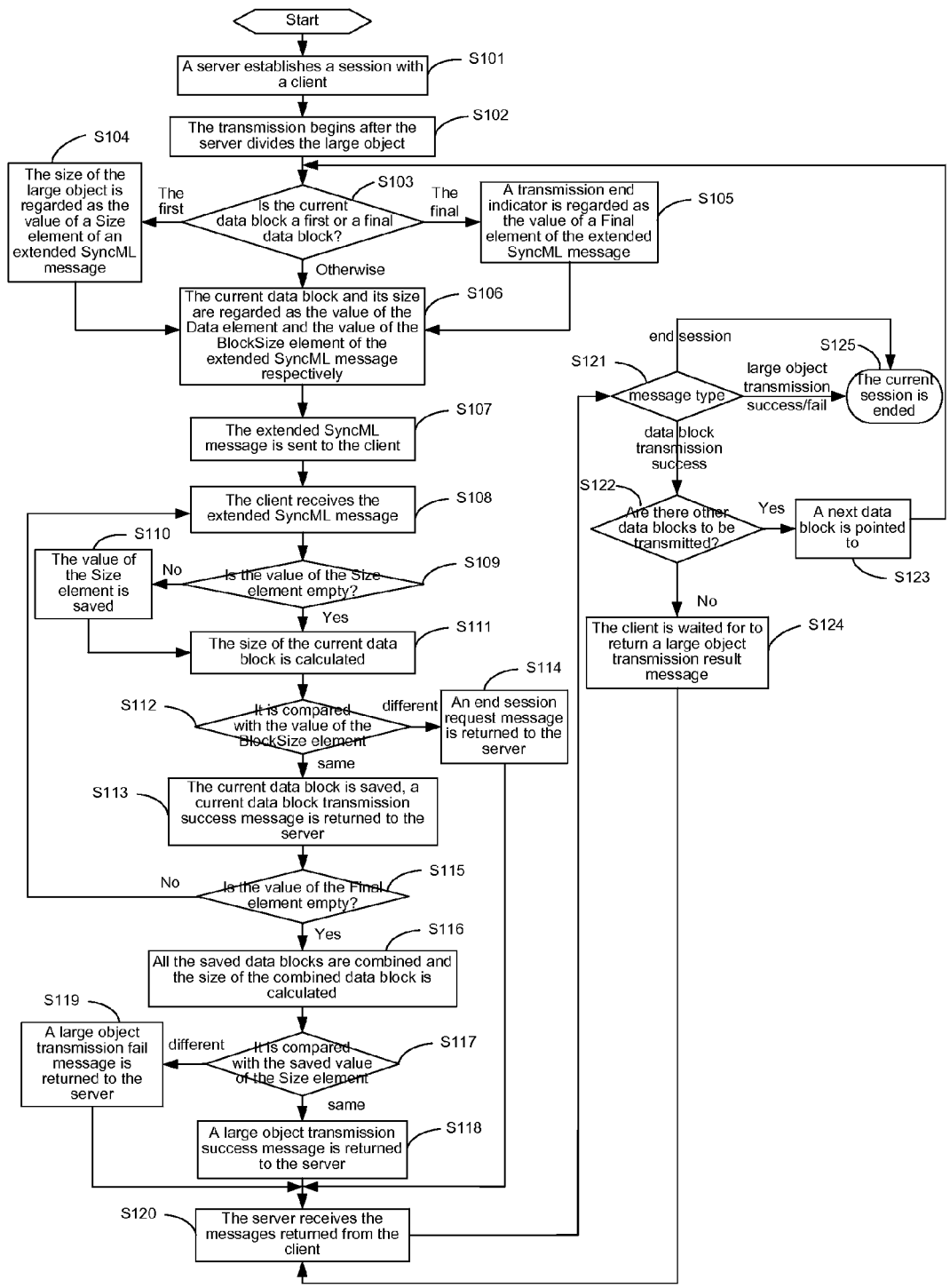
FIG. 2 shows a flowchart of a method for transmitting a large object according to a second preferred embodiment of the present disclosure.

FIG. 2 shows a flowchart of a method for transmitting a large object according to a second preferred embodiment of the present disclosure. In the embodiment, an unsuccessfully-transmitted data block is processed by a client by using a mechanism of requesting a server to end a session. The embodiment includes the following steps:

Step S101: A server establishes a session with a client;

Step S102: The currently-transmitted large object is divided according to the maximum number of bytes in a message supported by the client acquired in a session establishment process, and the large object is divided into data blocks and the transmission begins;

Step S103: It is determined whether the current data block is a first data block or a final data block, if it is the first data block, Step S104 is implemented; if it is the final data block, Step S105 is implemented; otherwise, Step S106 is implemented;

Step S104: The size of the currently-transmitted large object is regarded as the value of a Size element of an extended SyncML message, and Step S106 is implemented;

Step S105: The transmission end indicator is indicated as the value of the Final element of the extended SyncML message;

Step S106: The current data block and its size are regarded as the value of the Data element and the value of the BlockSize element of the extended SyncML message respectively;

Step S107: The extended SyncML message is sent to the client;

Step S108: The client receives the extended SyncML message;

Step S109: It is determined whether the value of the Size element of the above message is empty, if it is empty, Step S110 is implemented; otherwise, Step S111 is implemented;

Step S110: The value of the Size element is saved;

Step S111: The size of received data block is calculated;

Step S112: The size of the received data block is compared with the value of the BlockSize element, if they are the same, Step S113 is implemented; otherwise, Step S114 is implemented;

Step S113: The current data block is saved, a current data block transmission success message is returned to the server, and Step S115 is implemented;

Step S114: The current data block is discarded, an end session request message is returned to the server;

Step S115: It is determined whether the value of the Final element of the above message is empty, if it is empty, it indicates that the currently-transmitted data block is the final data block, and Step S116 is implemented; otherwise, Step S108 is implemented;

Step S116: All the saved data blocks are combined and the size of the combined data block is calculated;

Step S117: The size of the combined data block is compared with the saved value of the Size element, if they are the same, Step S118 is implemented; otherwise, Step S119 is implemented;

Step S118: A large object transmission success message is returned to the server, and Step S120 is implemented;

Step S119: A large object transmission fail message is returned to the server;

Step S120: The server receives the messages returned from the client;

Step S121: The type of the message returned from the client is determined, if it is the current data block transmission success message, Step S122 is implemented; If it is the end session request message, Step S125 is implemented; and if it is the large object transmission success/fail message, Step S125 is implemented;

Step S122: It is determined whether there are other data blocks to be transmitted, if there are other data blocks to be transmitted, Step S123 is implemented; otherwise, Step S124 is implemented;

Step S123: A next data block is pointed to, and Step S103 is implemented;

Step S124: The client is waited for to return a large object transmission result message, and Step S120 is implemented;

Step S125: The current session is ended.

Figure 3:
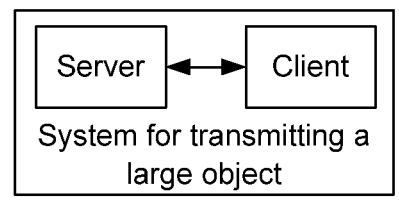
FIG. 3 shows a functional block diagram of a system for transmitting a large object according to preferred embodiments of the present disclosure.

FIG. 3 shows a functional block diagram of a system for transmitting a large object according to preferred embodiments of the present disclosure. The embodiment includes a server and a client, wherein the server is configured to: divide a pre-transmitted large object into data blocks with their sizes smaller than or equal to a maximum number of bytes in a message according to the maximum number of bytes in a message supported by a client, and transmit one by one in sequence the acquired data blocks and their sizes to the client by an extended SyncML message; transmit the size of the large object to the client when a first data block and its size are sent; transmit a transmission end indicator to the client when a final data block and its size are sent; transmit a next data block and its size to the client when the message returned by the client is a current data block transmission success message and there are other data blocks to be transmitted; transmit sequentially the current data block and its size to the client when the message returned by the client is a re-transmitting current data block request message; and end the current session when the message returned by the client is an end session request, a large object transmission success message or a large object transmission fail message; and the client is configure to: calculate actual size of a received data block, compare it with the received size of the data block, determine whether the received data block is transmitted successfully, then save the data block and return a current data block transmission success message to the server when the data block is transmitted successfully; return an end session request message or a re-transmitting current data block request message to the server when the data block is transmitted unsuccessfully; save the received size of the large object; and when a transmission end indicator is received and the current data block is transmitted successfully, combine in sequence the saved data blocks and calculate a total size of the above data blocks, compare it with the saved size of the large object, return a large object transmission success message to the server when the both sizes have no differences; and return a large object transmission fail message to the server when the both sizes have differences.

The above description shows and describes preferred embodiments of the present disclosure, but as mentioned above, it should be appreciated that the invention is neither limited to the form disclosed herein, nor seen to exclude other embodiments, instead, the invention can be used in various other combinations, modifications and circumstances, and can be modified according to the above teachings or technologies or knowledge in the related field within the scope of vision described herein. All the modifications and variants made by those skilled in the art without departing from the spirit and scope of the present disclosure fall within the scope of protection of the present disclosure.

INDUSTRIAL APPLICABILITY

In the present disclosure, when a data block is transmitted, the size of the data block together with the data block is sent to a client, every time the client receives the data block, the client determines whether it is transmitted successfully, therefore, when there is an error in transmitting a data block of a large object, the method and the system in the present disclosure can learn it in time and process it in advance, thus saving bandwidth resources.

The invention claimed is:

1. A method for transmitting a large object from a server to a client based on Open Mobile Alliance (OMA) Synchronization Markup Language (SyncML) protocol, the method comprising:

dividing, by a server, a pre-transmitted large object into data blocks, and transmitting one by one in sequence acquired data blocks and their sizes to the client, wherein the large object is an object the size of which is larger than a maximum number of bytes in a message supported by the client;

determining, by the client, whether a received data block is transmitted successfully;

if the received data block is transmitted successfully, saving the data block, and returning a current data block transmission success message to the server;

if the received data block is not transmitted successfully, returning an end session request message or a re-transmitting current data block request message to the server; and transmitting, by the server, the corresponding data block and its size or ending the session according to the received messages;

wherein the client determines whether the received data block is transmitted successfully by the following way;
calculating an actual size of the data block, and
comparing the actual size of the data block with the received size of the data block, if they are the same, the data block is transmitted successfully, otherwise, the data block is transmitted unsuccessfully;

wherein the step of transmitting, by the server, the corresponding data block and its size or ending the session according to the received messages comprises:
when the current data block transmission success message is received and there are other data blocks to be transmitted, transmitting, by the server, a next data block and its size to the client,
when the re-transmitting current data block request message is received, transmitting sequentially, by the server, the current data block and its size to the client, and
when the end session request message is received, ending, by the server, the current session.

2. The method according to claim 1, wherein if a currently-transmitted data block is a first data block of the large object, the server further transmits the size of the large object to the client; and the client saves the received size of the large object.

3. The method according to claim 2, wherein if a currently-transmitted data block is a final data block of the large object, the server further transmits a transmission end indicator to the client;

after the transmission end indicator is received and the current data block is transmitted successfully, the client executes the following steps:

combining in sequence the saved data blocks and calculating a total size of the data blocks; and comparing the total size of the data blocks with the saved size of the large object, if they are the same, returning a large object transmission success message to the server; otherwise, returning a large object transmission fail message to the server.

4. The method according to claim 1, wherein the server transmits the data block and its size, the size of the large object and a transmission end indicator to the client by an extended Synchronization Markup Language (SyncML) message; and the extended SyncML message comprises a Size element, a Data element, a BlockSize element and a Final element, wherein the value of the Size element is the size of the large object, the value of the Data element is the currently-transmitted data block, the value of the BlockSize element is the size of the currently-transmitted data block, and the value of the Final element is the transmission end indicator.

5. A system for transmitting a large object from a server to a client based on Open Mobile Alliance (OMA) Synchronization Markup Language (SyncML) protocol, comprising a server and a client, wherein the server is configured to: divide a pre-transmitted large object into data blocks and transmit one by one in sequence acquired data blocks and their sizes to the client; and transmit corresponding data block and its size or end a session according to messages returned by the client;

wherein the large object is an object the size of which is larger than a maximum number of bytes in a message supported by the client; and wherein the client is configured to: determine whether a received data block is transmitted successfully, save the data block and return a current data block transmission success message to the server when the data block is transmitted successfully, and return an end session request message or a re-transmitting current data block request message to the server when the data block is not transmitted successfully;

wherein the server is further configured to: transmit a next data block and its size to the client when the current data block transmission success message is received and there are other data blocks to be transmitted, transmit sequentially the current data block and its size to the client when the re-transmitting current data block request message is received, and end the current session when the end session request message is received; and wherein the client is further configured to calculate an actual size of the data block and compare the actual size of the data block with the received size of the data block, if they are the same, the data block is transmitted successfully; otherwise, the data block is transmitted unsuccessfully.

6. The system according to claim 5, wherein the server is further configured to: transmit the size of the large object to the client when a first data block and its size are sent, and transmit a transmission end indicator to the client when a final data block and its size are sent; and the client is further configured to: save the received size of the large object; and combine in sequence saved data blocks, calculate a total size of the data blocks, and compare the total size of the data blocks with the saved size of the large object, if they are the same, a large object transmission success message is returned to the server, if they are different, a large object transmission fail message is returned to the server.

7. The system according to claim 6, wherein the server transmits the data block and its size, the size of the large object and the transmission end indicator to the client by an extended SyncML message.

8. The system according to claim 5, wherein the server transmits the data block and its size, the size of the large object and the transmission end indicator to the client by an extended SyncML message.

9. The system according to claim 5, wherein the server transmits the data block and its size, the size of the large object and the transmission end indicator to the client by an extended SyncML message.

* * * * *